Oct. 1, 1929.     O. NIMRICK ET AL     1,730,089
WATER VAPORIZER FOR INTERNAL COMBUSTION ENGINES
Filed Dec. 16, 1927
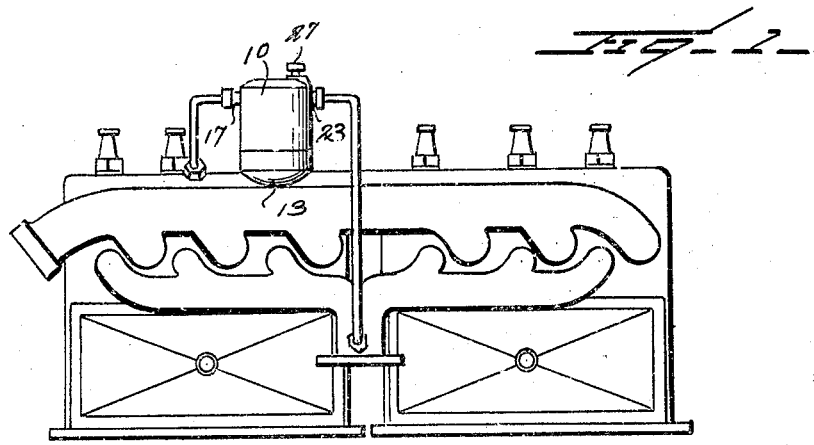
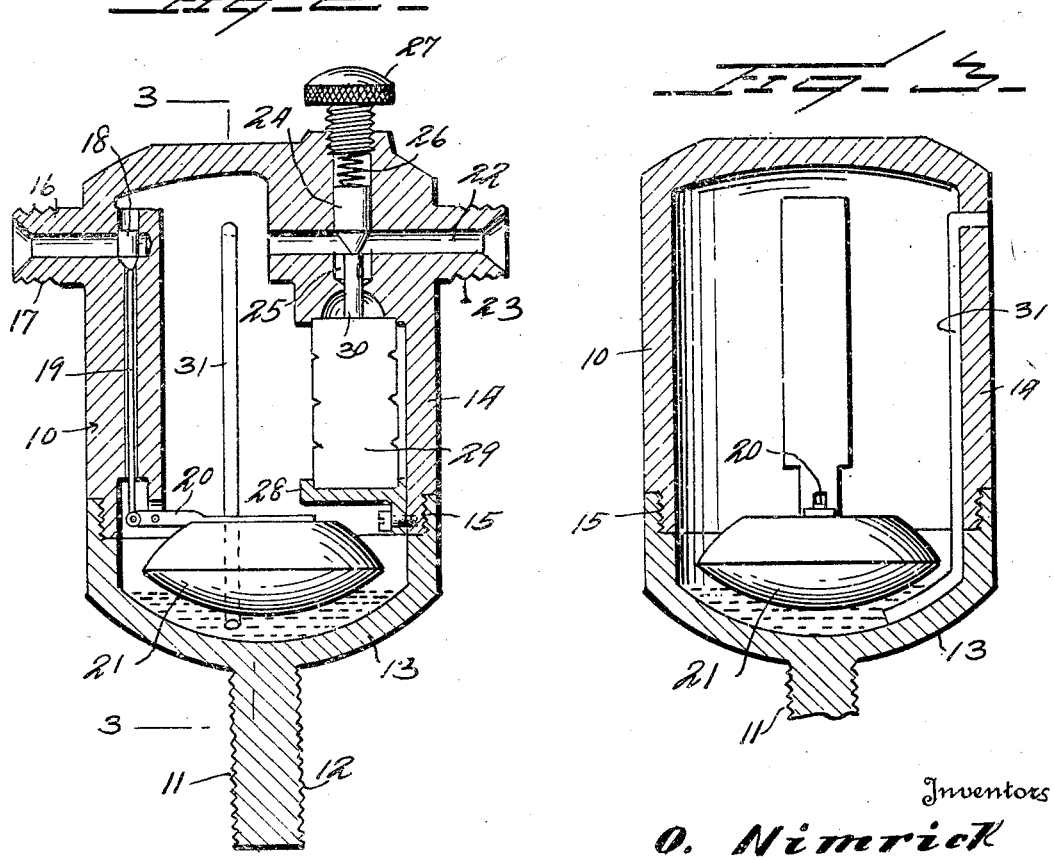
Inventors
O. Nimrick
& G. W. Hinton
By Watson E. Coleman
Attorney Patented Oct. 1, 1929

1,730,089

UNITED STATES PATENT OFFICE

ORAL NIMRICK AND GROVER W. HINTON, OF DANVILLE, ILLINOIS, ASSIGNORS, BY DIRECT AND MESNE ASSIGNMENTS, TO THE DYNAMIC FUELIZER COMPANY, A CORPORATION OF NEW JERSEY

WATER VAPORIZER FOR INTERNAL-COMBUSTION ENGINES

Application filed December 16, 1927. Serial No. 240,471.

This invention relates to vaporizers for internal combustion engines, and particularly to means for vaporizing water taken from the water jacket of an internal combustion engine and discharged into the intake manifold.

One of the objects of the invention is to provide a device of this character which is mounted upon the exhaust manifold of the engine so that the exhaust manifold acts as the means for heating and vaporizing the water in the vaporizing chamber.

A further object is to provide a thermostatically controlled valve, the thermostat of which is disposed within the vaporizing chamber, which will expand or contract with variations in temperature in the water of the chamber, causing the outlet controlling valve to close or open in consonance therewith.

A still further object is to provide means whereby air may be introduced into the vaporizing chamber at a level below the water therein so that upon the suction stroke of the engine this air will be drawn up through the water so that the air will become heated and the air in turn agitating the water in the bottom of the chamber, causing the water to be vaporized more rapidly.

Other objects will appear in the course of the following description.

Our invention is illustrated in the accompanying drawing, wherein:—

Figure 1 is an elevation of an automobile engine with our device applied thereto;

Figure 2 is a vertical sectional view of the device;

Figure 3 is a section on the line 3—3 of Figure 2.

Referring to this drawing, 10 designates the body of the vaporizer, which is made of metal and which is provided with the exteriorly screw-threaded stem 11 at its lower end adapted to be screwed into the exhaust manifold of the engine. The stem 11 is exteriorly screw-threaded, as at 12. The body 10 is formed in two sections, a lower section 13 and an upper section 14. These have a screw-threaded connection at 15.

The upper end of the body is formed with the water inlet port 16 which extends out through an exteriorly screw-threaded boss 17. A valve 18 is mounted at the inner end of this duct 16 and this valve is connected by a longitudinally extending valve rod 19 to a float actuated lever 20 carried by a float 21, this float being disposed in the bottom of the chamber or closely adjacent thereto. Extending from the upper portion of the chamber is a port 22 which extends out through an exteriorly screw-threaded boss or nipple 23 which may be connected by a pipe to the intake manifold of the engine.

Operating through the upper wall of the chamber and across the port 22 is a valve 24 having a tapered lower end, this valve when closed being depressed into the valve seat 25 formed in the upper wall of the chamber below the bore 22. A spring 26 urges the valve to a closed position and a screw 27 engages this spring and has screw-threaded engagement with the wall of the chamber so that as this screw is turned, the tension of the spring may be adjusted.

Mounted upon a bracket 28 attached to the wall of the chamber is a thermostat 29 or other heat responsive element of any suitable construction. This heat responsive element 29 has a stem 30 which extends up through the seat 25 for valve 24 and bears against the lower extremity of the valve. It will be seen, therefore, that as the heat responsive element expands, the valve will be forced up to the position shown in Figure 2 and as the heat responsive element contracts the valve will move downward toward its seat, thus reducing the flow of vapor through the outlet duct 22. An air duct or air inlet pipe 31 comes in through the side of the chamber adjacent the top thereof and extends through to the bottom of the chamber and into the water, this pipe or duct terminating short of the bottom of the chamber.

In the operation of this device, the heat from the exhaust and the products of combustion in the exhaust pipe will act to heat the stem 11 and the casing 10 and thus the water in the bottom of the chamber will be heated. On each suction stroke of the engine, air is drawn in through the pipe 31 and discharged into the water in the bottom of the chamber and is drawn upward through this water. Thus the air becomes heated, the water becomes vaporized, and the water in the bottom of the chamber is agitated, thus vaporizing the water more rapidly. As the heat of the water increases, the heat in the chamber will increase and this will cause the thermostat 29 to expand, thus opening the valve 24 eventually to its full extent and permitting a greater amount of the hot vapor to pass out through the opening 22. If for any reason the heat reduces, the valve tends to close and this reduces the amount of vapor passing out through the outlet 22.

It will be seen that the expanding element, that is the thermostat 29, is so applied that in starting the cold motor, the steam vaporizer is not in direct connection with the engine and it is only after the engine starts to heat that it causes the temperature controlled element 29 to function to cause the opening of the valve 24 and thus allowing the moist vapor to pass into the intake manifold. When the engine stops and the engine cools, the thermostat 29 contracts and the valve closes leaving the vaporizer as a separate part of the engine on restarting. This is a condition of operation which is particularly valuable, as thus induced energy is secured when it is most needed and when in use the vaporizer promotes the combustion of the fuel, reduces the gasoline consumption and tends to eliminate carbon. The amount of water in the vaporizer is not dependent upon the action of the thermostat 29 but is entirely controlled by the float 21 operating independently of the thermostat. The amount of vapor taken into the intake manifold is, of course, controlled by the degree of opening of the valve 24 and by the regulation of the tension of spring 26 under the action of the screw 27.

We do not wish to be limited to any particular form of heating element, as this may be varied in many ways without departing from the spirit of the invention as hereinafter defined. Neither do we wish to be limited to the exact construction illustrated, as many of the minor details might be changed without departing from the spirit of the invention.

We claim:—

1. A water vaporizer for internal combustion engines comprising a body formed to provide an interior chamber, the body having means whereby it may be heated, a water inlet to the chamber, a float disposed within the chamber and acting to retain the water in the chamber at a constant level, the chamber having an outlet duct, a valve controlling passage through the duct, a thermostat disposed within the chamber and acting to control said valve, and an air duct opening through the chamber and opening below the level of the water within the chamber.

2. A water vaporizer for internal combustion engines comprising a body formed to provide a chamber, the body being formed at its upper end with a water inlet duct and a vapor outlet duct, a valve controlling the entrance of water through said duct, a float mounted in the lower portion of the chamber and controlling said valve, the lower portion of the chamber being formed with a stem whereby the device may be mounted upon an exhaust pipe, a tapered valve mounted in the upper portion of the chamber and movable across said outlet duct, a heat responsive element mounted within the chamber and having a stem engaging the tapered end of the valve, and means urging the valve toward a closed position.

3. A water vaporizer for internal combustion engines comprising a body formed to provide a chamber, the body being formed at its upper end with a water inlet duct and a vapor outlet duct, a valve controlling the entrance of water through said duct, a float mounted in the lower portion of the chamber and controlling said valve, the lower portion of the chamber being formed with means whereby the device may be mounted upon an exhaust pipe, a tapered valve mounted in the upper portion of the chamber and movable across said outlet duct, a heat responsive element mounted within the chamber and having a stem engaging the tapered end of the valve means urging the valve toward a closed position, and means whereby the urging means may be regulated, the chamber being provided with an air inlet duct extending into the lower portion of the chamber and opening below the water line thereof.

4. A water vaporizer for internal combustion engines comprising a body formed in an upper and lower section, the body being formed with an interior chamber, the lower section of the body having a tubular stem adapted to be engaged with the exhaust manifold of an engine, the upper portion of the body having a water inlet duct and a vapor outlet duct, a valve for the water inlet duct, a float operatively connected to the valve and disposed in the lower portion of the chamber, a downwardly tapered valve intersecting the vapor outlet duct, a spring urging the valve toward a closed position, means for regulating the spring, a heat responsive element disposed within the chamber below the valve and having a stem extending upward and intersecting said duct and bearing against the lower end of the valve, and means for conducting outside air into the interior of the chamber and discharging it below the water line therein.

In testimony whereof we hereunto affix our signatures.

ORAL NIMRICK.
GROVER W. HINTON.